United States Patent
Künkel et al.

(10) Patent No.: US 6,249,670 B1
(45) Date of Patent: *Jun. 19, 2001

(54) SIGNAL COMBINING DEVICE AND METHOD FOR RADIO COMMUNICATION

(75) Inventors: Lars Peter Künkel, Landskrona; Karl-Johan Fagerström, Örebro, both of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,326

(22) Filed: Apr. 30, 1997

Related U.S. Application Data

(60) Provisional application No. 60/035,478, filed on Jan. 13, 1997.

(51) Int. Cl.[7] ........................................ H04B 1/00
(52) U.S. Cl. ................................ 455/83; 455/552
(58) Field of Search ................. 455/82, 83, 84, 455/552, 553; 333/101, 103, 32

(56) References Cited

U.S. PATENT DOCUMENTS

| | | |
|---|---|---|
| 4,141,016 | 2/1979 | Nelson . |
| 5,193,218 * | 3/1993 | Shimo ............................ 455/82 |
| 5,212,813 | 5/1993 | Renaud . |
| 5,258,728 | 11/1993 | Taniyoshi et al. . |
| 5,285,177 | 2/1994 | Norose . |
| 5,386,203 * | 1/1995 | Ishihara ........................ 455/82 |
| 5,442,812 * | 8/1995 | Ishizaki et al. ................. 455/83 |
| 5,513,382 * | 4/1996 | Agahi-Kesheh et al. ....... 333/103 |
| 5,564,077 | 10/1996 | Obayashi et al. . |
| 5,652,599 * | 7/1997 | Pitta et al. ..................... 343/858 |
| 5,768,691 * | 6/1998 | Matero et al. .................. 333/101 |
| 5,784,687 * | 7/1998 | Itoh et al. ...................... 455/83 |
| 5,815,804 * | 9/1998 | Newell et al. .................. 455/82 |
| 5,821,831 * | 10/1998 | Marland ......................... 333/132 |

FOREIGN PATENT DOCUMENTS

| | | |
|---|---|---|
| 0502546 A2 | 9/1992 | (EP) . |
| 0678974 A2 | 10/1995 | (EP) . |

* cited by examiner

Primary Examiner—Vivian Chang
Assistant Examiner—Makoto Aoki
(74) Attorney, Agent, or Firm—Burns, Doane, Swecker & Mathis, L.L.P.

(57) ABSTRACT

A signal combining device and method allows a mobile unit to use a single antenna to receive and transmit information in two or more frequency ranges. The combining device includes a first and second transmitting circuits and a first and second receiving circuits, which are connected to a matching device. The matching device, in turn, is connected to the antenna. The first transmitting circuit and the first receiving circuit are designed to transmit and receive, respectively, a digital signal, and the second transmitting circuit and the second receiving circuit are designed to transmit and receive, respectively, an analogue or a digital signal. By using the signal combining device it is possible to combine signals of different frequency bands, especially digital signals and analogue signals of different frequency bands. As such, the present invention allows for the use of a common antenna in a dual mode radio. The invention finds exemplary use in a cellular mobile radio communication system and/or a satellite radio communication system.

1 Claim, 11 Drawing Sheets

SIGNAL COMBINING DEVICE AND METHOD FOR RADIO COMMUNICATION

CROSS-REFERENCE TO RELATED APPLICATIONS

This application claims the benefit of U.S. Provisional Application No. 60/035,478, filed on Jan. 13, 1997, which is incorporated in its entirety herein by reference.

BACKGROUND

The present invention relates to a signal combining device for a dual band radio having an antenna for use in a mobile unit in a cellular mobile radio communication system including at least one base station and/or for use in a satellite radio communication system. The present invention also relates to a method for combining signals in a signal combining device for a dual band radio having an antenna for operation in a cellular mobile radio communication system including at least one base station and/or for operation in a satellite radio communication system.

Radio communications systems typically operate using different frequency ranges. For instances, in the United States, the AMPS protocol may be designed to operate in the 824–849 MHz and 869–894 MHz ranges, while the PCS system may be designed to operate in the 1850–1910 MHz and 1930–1990 ranges. In addition, different geographic areas (e.g. states) may allocate different frequency ranges for use in radio communication.

Furthermore, in some instances, both analogue and digital forms of radio communication are used, providing "dual mode" radio communication. For example, digital Time Division Multiple Access (TDMA) systems can be used for reception and transmission of digital signals. Continuous transmission and reception is used for the transmission and reception of analogue signals.

SUMMARY

It is an exemplary objective of the invention to provide a device for use in a dual or multi band mobile radio for receiving and transmitting analog and digital electromagnetic information in different spectrum ranges using a single antenna.

It is another exemplary objective of the present invention to provide a device for use in a dual or multi band mobile radio using a common antenna which can be used in a digital mobile radio communication system for the 1900 MHz frequency range (e.g. for PCS 1900), and in an analogue mobile radio communication system for the 800 MHz frequency range (e.g. for AMPS 800).

These and other objectives are achieved in the present invention through the use of a signal combining device for a dual band radio, including an antenna which has a first and a second transmitting circuits and a first and a second receiving circuits connected to a device for matching. The device for matching is also connected to the antenna. The first transmitting circuit and the first receiving circuit are designed to transmit and receive, respectively, a digital signal, and the second transmitting circuit and the second receiving circuit are designed to transmit and receive, respectively, an analogue or a digital signal.

Another exemplary embodiment of the present invention provides a signal combining device for a multi-band radio communication system using a single antenna. This embodiment employs more than two transmitting and receiving circuits, respectively, which are connected to a device for matching, which in turn, is connected to the antenna.

According to another exemplary embodiment of the invention, a combining device can be used in a radio which can operate in the frequency range of 1850–1910 (e.g. the PCS band). The first transmitting circuit sends out information in this band. The same radio can also operate in the frequency range of 824–849 (e.g. the AMPS band). The second transmitting circuit sends out information in this band. In this embodiment, there is a frequency difference of 1001 MHz between the signal that the first transmitting circuit is designed to transmit and the signal that the second transmitting circuit is designed to transmit. Generally speaking, the present invention can be used in all dual band (or multi band) applications where there is a sufficient separation in bands.

According to more specific exemplary aspects of the present invention, a signal which is transmitted from the first transmitting circuit to the antenna passes through a first device for switching, wherein a first contact of the first device for switching and a second contact of the first device for switching are connected to the first transmitting circuit and to the antenna, respectively. According to several exemplary embodiments, a second resonance circuit is additionally interposed between the first device for switching and the antenna.

Advantageously, a signal transmitted from the second transmitting circuit to the antenna passes first through a first device for filtering and thereafter through the device for matching, and then to the antenna. The first device for filtering has a first contact connected to the second transmitting circuit and a second contact connected to a connection point located between the second transmitting circuit, the second receiving circuit and a first contact of the device for matching. The first device for filtering has a high reflection coefficient at the second contact of the first device for filtering at least for signals received by the second receiving circuit. The device for matching has, in addition to the first contact, a second contact which is connected to the antenna.

A signal received by the first receiving circuit from the antenna passes first through a first device for impedance transforming and then passes through a second device for impedance transforming, which is set to zero in several exemplary embodiments. Thereafter, the signal passes through a second device for filtering. Optionally, the second device for filtering can be omitted. The first device for impedance transforming has a first contact connected to the antenna and a second contact connected to a first contact of the second device for impedance transforming. The second device for impedance transforming has a second contact which is connected to a first contact of the second device for filtering. The second device for filtering has a second contact which is connected to the first receiving circuit. A second device for switching has a first contact connected to a connection point between the second contact of the first device for impedance transforming and the first contact of the second device for impedance transforming. The second device for switching has a second contact connected to signal ground. In several exemplary embodiments, a second resonance circuit is additionally interposed between the antenna and the first device for impedance transforming.

A signal received by the second receiving circuit from the antenna passes first through the device for matching and then through a third device for filtering. In this embodiment, the third device for filtering has a first and a second contact. The first contact of the third device for filtering is connected to the connection point located between the second transmitting circuit, the second receiving circuit and the first contact of the device for matching. The second contact of the third device for filtering is connected to the second receiving circuit. The third device for filtering in this embodiment has a high reflection coefficient at the first contact of the third device for filtering at least for signals transmitted from the second transmitting circuit.

According to other exemplary embodiments, a method is provided for combining signals in a signal combining device for a dual band radio having an antenna. The signal combining device for a dual band radio comprises a first and second transmitting circuits and a first and second receiving circuits connected to a device for matching, which, in turn, is connected to the antenna. A digital signal is transmitted from the first transmitting circuit and received by the second receiving circuit, and an analogue or a digital signal is transmitted from the second transmitting circuit and received by the second receiving circuit. There is a band-separation between the frequencies of the digital signal that the first transmitting circuit is designed to transmit and the analogue (or digital) signal that the second transmitting circuit is designed to transmit. There is also a band-separation between the frequencies that the first receiving circuit and the second receiving circuit are designed to receive.

According to another exemplary embodiment, a method is provided for combining signals in a mobile unit having an antenna for operation in a cellular mobile radio communication system including at least one base-station and/or for operation in a satellite radio communication system. The signal combining device for a dual band radio including a common antenna has a first and a second transmitting circuits and a first and a second receiving circuits connected to a device for matching, which in turn, in connected to the antenna. A digital signal is transmitted from the first transmitting circuit and a digital signal is received by the first receiving circuit. Either an analogue signal or a digital signal is transmitted from the second transmitting circuit and received by the second receiving circuit.

The present invention can be used in many types of communication systems (other than the above-mentioned cellular and satellite systems). An example of such a radio communication system is the DECT system (Digital Enhanced Cordless Telecommunications). Examples of digital radio communication systems in which the signal combining device according to the present invention can be used are D-AMPS 800, D-AMPS 1900, DCS 1800, PCS 1900, GSM 900, GSM 1800, PDC 800 and PDC 1500. Examples of analogue radio communication systems in which the signal combining device according to the present invention can be used are NMT 450, AMPS 800, NMT 900 and TACS. By means of the present invention, it is possible to combine analogue signals of any of the aforementioned analogue radio communication systems and digital signals of any of the aforementioned digital radio communication systems, so long as the analogue and digital signals have sufficiently different frequency bands. It is also possible by means of the present invention to combine different analogue signals of any of the aforementioned analogue radio communication systems, if the analogue signals are of different frequency bands. The same applies to the digital signals used in the aforementioned digital radio communication systems. Accordingly, the present invention finds special exemplary applicability in dual (or multi) band radio communication, or a combination of dual band radio communication and dual mode radio communication.

The invention is described in detail below in exemplary terms of a signal combining device for a dual band radio having two transmitting circuits and two receiving circuits. However, it will be apparent to those skilled in the art that the invention can be expanded for use, as described above, in multi-band (e.g. more than two bands) radio communication systems, which may also employ aspects of multi-mode radio communication. In such a case, more than two transmitting and receiving circuits, respectively are connected to the aforementioned device for matching.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
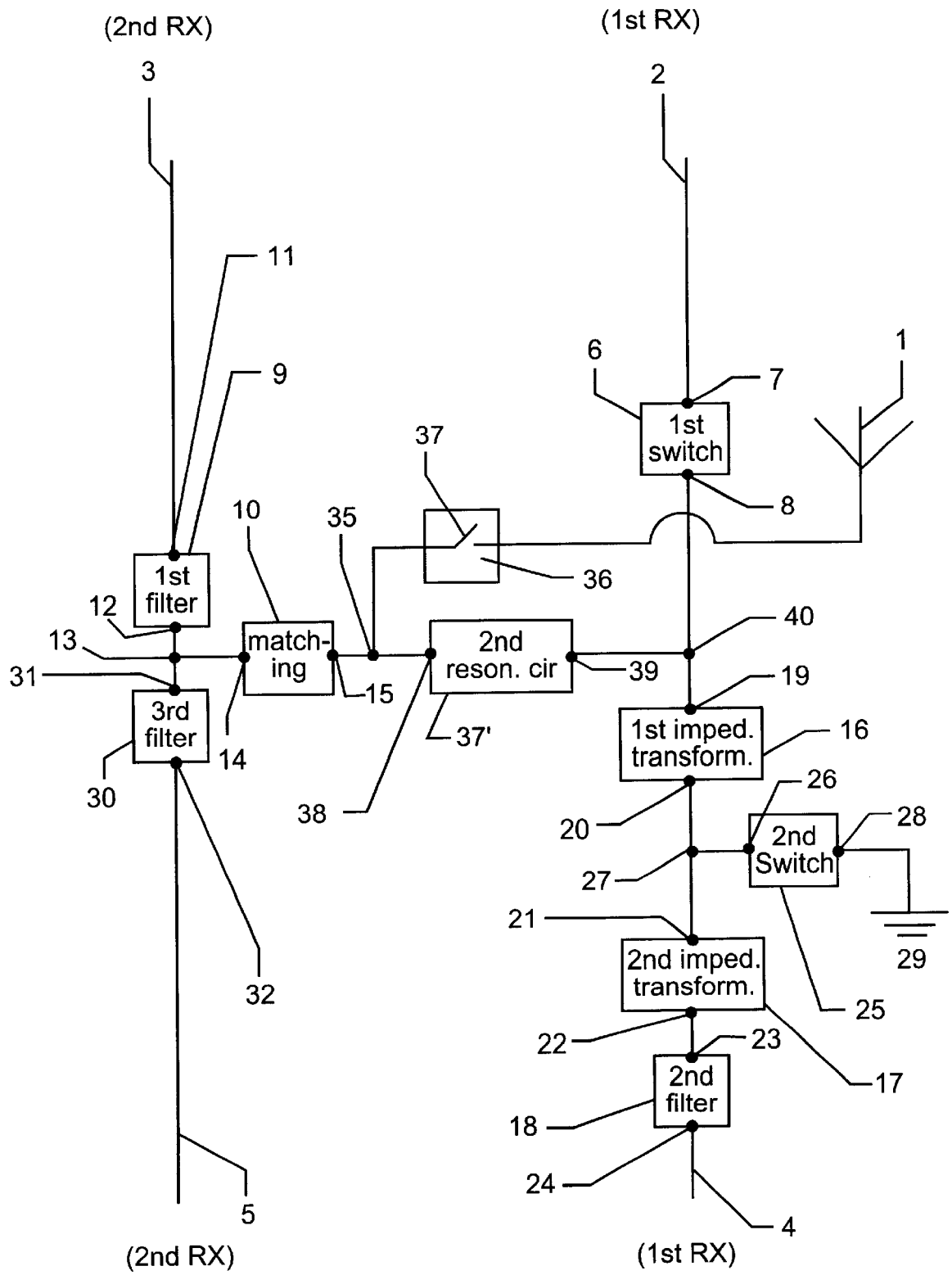
FIG. 1 is a block diagram showing a general embodiment of a signal combining device for dual band radio communication according to exemplary aspects of the present invention.

In the following description, for purposes of explanation and not limitation, specific details are set forth in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail. In the drawings, like numerals represent like features.

The term "mobile unit" encompasses any mobile unit with the ability to send and transmit electromagnetic signals, such as radio signals. The term mobile unit encompasses, but is not limited to, mobile phones, hand-held data organizers, head-sets, calculators, pagers, phone answering machines, printers, telefax-machines, and other electronic devices which use wireless communication.

FIG. 1 is a block diagram showing a general embodiment of a signal combining device for a dual band radio according to the present invention, for exemplary use in combining signals in a mobile unit having a dual band transmission and reception antenna 1. The invention finds exemplary use in a cellular mobile radio communication system including at least one base station and/or for operation in a satellite radio communication system.

The embodiment shown in FIG. 1 includes an antenna matching network 36 connected to the antenna 1 for transforming the antenna impedance. The antenna matching network 36 includes a device 37 for switching the antenna matching network 36. Two transmitting circuits (2, 3) and two receiving circuits (4, 5) are connected to a device for matching 10, which is connected to the antenna 1. As will be described in detail later, the device for matching can comprise a resonance circuit, a stripline impedance transforming device, or other type of device. The first transmitting circuit 2 and the first receiving circuit 4 are designed to transmit and receive, respectively, a digital signal. The second transmitting circuit 3 and the second receiving circuit 5 are designed to transmit and receive, respectively, an analogue or a digital signal. These circuits (2, 3, 4, 5) are shown as the terminal ends of respective wires, but may include respective processing circuitry which is not shown, as will be apparent to those skilled in the art.

A signal transmitted from the second transmitting circuit 3 via the antenna matching network 36 to the antenna 1 passes first through a first device for filtering 9, and thereafter through a device for matching 10. The first device for filtering 9 has a first contact 11 and a second contact 12. The first contact 11 of the first device for filtering 9 is connected to the second transmitting circuit 3. The second contact 12 of the first device for filtering 9 is connected to a connection point 13 located between the second transmitting circuit 3, the second receiving circuit 5 and a first contact 14 of the device for matching 10. The first device for filtering 9 has a high reflection coefficient at its second contact 12 at least for signals received by the second receiving circuit 5. The device for matching 10 has, in addition to the first contact 14, a second contact 15 which is connected to the antenna 1.

A signal received by the second receiving circuit 5 from the antenna 1 passes first through the antenna matching network 36, and then through the device for matching 10, and thereafter through a third device for filtering 30. The third device for filtering 30 has a first contact 31 and a second contact 32. The first contact 31 of the third device for filtering 30 is connected to the connection point 13 located between the second transmitting circuit 3, the second receiving circuit 5 and the first contact 14 of the device for matching 10. The second contact 32 of the third device for filtering 30 is connected to the second receiving circuit 5. The first contact 31 of the third device for filtering 30 has a high reflection coefficient at least for signals transmitted from the second transmitting circuit 3.

A signal transmitted from the first transmitting circuit 2 via the antenna matching network 36 to the antenna 1 passes first through a first device for switching 6 and finally through a second resonance circuit 37'. The first device for switching 6 can, for instance, comprise a diode, such as a PIN diode, or can comprise an electrically operated switch. The first device for switching 6 has a first contact 7 and a second contact 8 and the second resonance circuit 37' has a first contact 38 and second contact 39. The first contact 7 of the first device for switching 6 is connected to the first transmitting circuit 2. The second contact 8 of the first device for switching 6 is connected to the second contact 39 of the second resonance circuit 37'. The first contact 38 of the second resonance circuit 37' is connected to a connection point 35 which is located between the antenna 1, the second contact 15 of the device for matching 10 and the first contact 38 of the second resonance circuit 37'.

A signal received by the first receiving circuit 4 from the antenna 1 via the antenna matching network 36 passes first through the second resonance circuit 37', and then passes through a first device for impedance transforming 16. The signal then passes through a second device for impedance transforming 17, and finally passes through a second device filtering 18. The first device for impedance transforming 16 has a first contact 19 and a second contact 20. The second device for impedance transforming 17 has a first contact 21 and a second contact 22. The second device for filtering 18 has a first contact 23 and a second contact 24. The first contact 19 of the first device for impedance transforming 16 is connected to a connection point 40 which is located between the second contact 8 of the first device for switching 6, the first contact 19 of the first device for impedance transforming 16 and the second contact 39 of the second resonance circuit 37'. The second contact 20 of the first device for impedance transforming 16 and the first contact 21 of the second device for impedance transforming 17 are connected to a connection point 27 which is located between the second contact 20 of the first device for impedance transforming 16, the first contact 21 of the second device for impedance transforming 17 and a first contact 26 of a second device for switching 25. The second contact 22 of the second device for impedance transforming 17 is connected to the first contact 23 of the second device for filtering 18. The second contact 24 of the second device for filtering 18 is connected to the first receiving circuit 4. The second device for switching can comprise, for instance, a diode or another type of electrically operated switch, such as, for instance, a field effect transistor. The second device for switching 25 has, in addition to the first contact 26, a second contact 28 connected to signal ground 29.

The remaining Figures show various ways of implementing the general circuit shown in FIG. 1, some of which may vary in certain aspects from the basic layout shown in FIG. 1, but employ the same general principle of operation as the circuit shown in FIG. 1 (to be described later).

Figure 2:
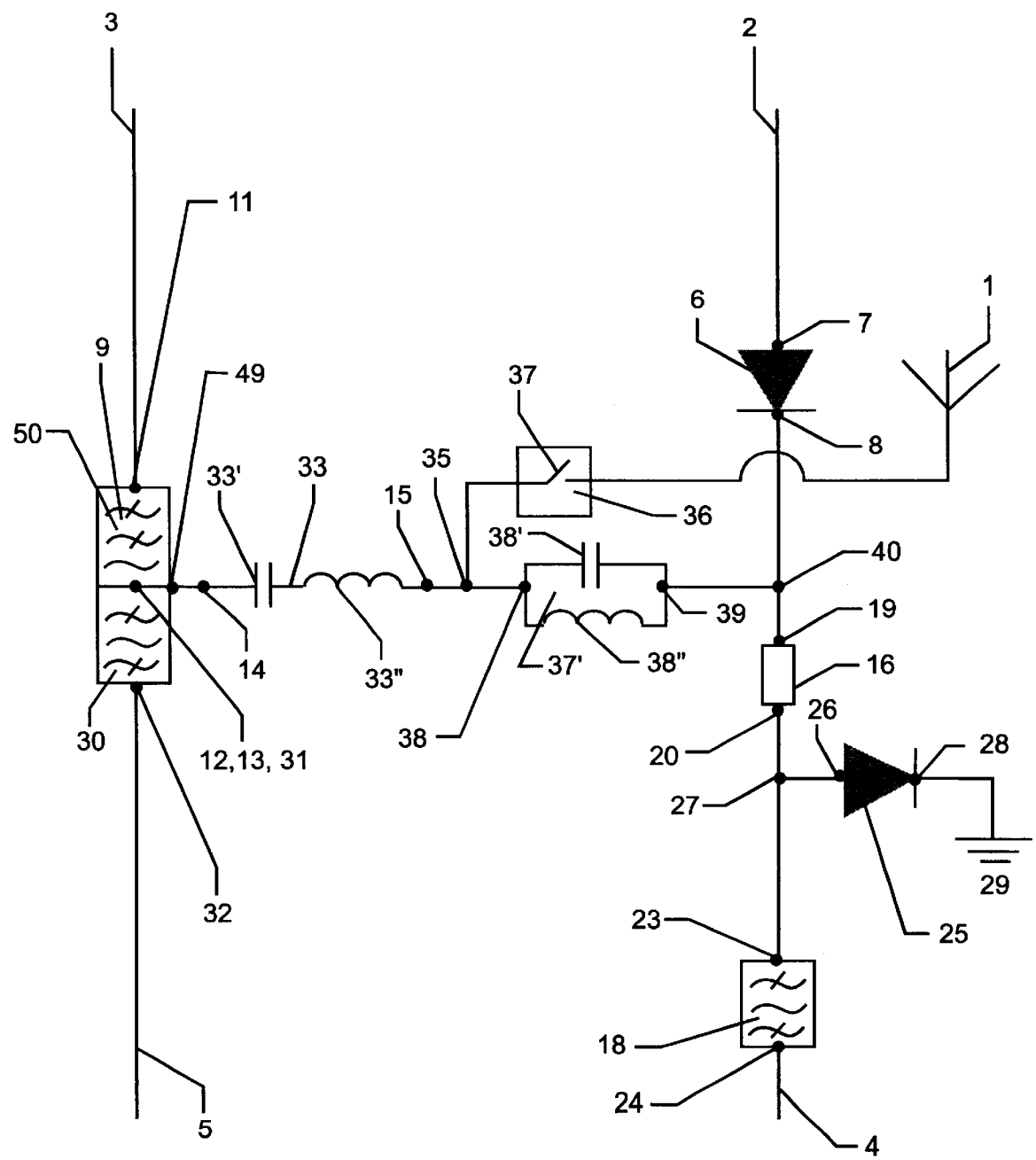
FIG. 2 is an electrical schematic diagram showing a first exemplary embodiment of a signal combining device for dual band radio communication according to the present invention.

FIG. 2, for instance, is an electrical schematic diagram showing a first embodiment of a signal combining device for a dual band radio according to the present invention intended to be used for combining signals in a mobile unit having a dual band transmission and reception antenna 1 for operation in a cellular mobile radio communication system including at least one base station and/or for operation in a satellite radio communication system. An antenna matching network 36 is provided for transforming the antenna impedance, and is connected to the antenna 1. The antenna matching network 36 is capable of transforming the antenna impedance to an impedance suitable for both bands at the connection point 35 located between the antenna 1, a second contact 15 of a first resonance circuit 33 and the first contact 38 of a second resonance circuit 37'. The antenna matching network 36 includes a device 37 for switching the antenna matching network 36. Two transmitting circuits (2, 3) and two receiving circuits (4, 5) are connected to the first resonance circuit 33, which is connected to the antenna 1. The first transmitting circuit 2 and the first receiving circuit 4 are designed to transmit and receive, respectively, a digital signal. The second transmitting circuit 3 and the second receiving circuit 5 are designed to transmit and receive, respectively, an analogue or a digital signal. There is a frequency difference between the signal that the first transmitting circuit 2 is designed to transmit and the signal that the second transmitting circuit 3 is designed to transmit to ensure a sufficient separation of bands.

The first device for filtering 9 and the third device for filtering 30 can be connected to each other in the manner shown in FIG. 2 to provide a single 3-port duplex filter 50. In other words, the first device for filtering 9 and the second device for filtering 30 are not separated from each other, as is the case shown in FIG. 1. However, the filter arrangement can also comprise two separate filters joined with some combining network, as shown in FIG. 1.

Continuing with the discussion of FIG. 2, the three ports of the duplex filter 50 comprise the first contact 11 of the first device for filtering 9, the second contact 32 of the third device for filtering 30 and the contact 49, respectively. Since the first device for filtering 9 and the third device for filtering 30 are connected to each other into a single 3-port duplex filter 50, a second contact 12 of the first device for filtering 9, a first contact 31 of the third device for filtering 30, as well as a connection point 13 between the second transmitting circuit 3 and the second receiving circuit 5, are physically brought together at a same point. As mentioned above, this is contrasted with the case in FIG. 1, where the second contact 12 of the third device for filtering 9, the first contact 31 of the third device for filtering 30, as well as the connection point 13 between the second transmitting circuit 3, the second receiving circuit 5 and the first contact 14 of the device for matching 10 are separated from each other.

A signal transmitted from the second transmitting circuit 3 via the antenna matching network 36 to the antenna 1 passes first through the first device for filtering 9 and thereafter through the first resonance circuit 33. The first device for filtering 9 has, in addition to the second contact 12, a first contact 11. The first contact 11 of the first device for filtering 9 is connected to the second transmitting circuit 3. The first device for filtering 9 has a high reflection coefficient at the second contact 12 of the first device for filtering 9 at least for signals received by the second receiving circuit 5. The first resonance circuit 33 consists of a capacitor 33' in series with an inductor 33''. The first resonance circuit 33 has such a resonance frequency that a signal transmitted from the second transmitting circuit 3 and received by the second receiving circuit 5, respectively, readily passes through the first resonance circuit 33. More specifically, in one exemplary embodiment, the first resonance circuit 33 has a resonance frequency located approximately mid-range between the frequency band of signals transmitted from the second transmitting circuit 3 and the frequency band of signals received by the second receiving circuit 5. Also, the first resonance circuit 33 is designed so that a signal transmitted from the first transmitting circuit 2 and received by the first receiving circuit 4, respectively, are blocked.

The first resonance circuit 33 has a first contact 14 in addition to the second contact 15. The first contact 14 of the first resonance circuit 33 is connected to the contact 49 of the duplex filter 50. As previously mentioned, the second contact 15 of the first resonance circuit 33 is connected to a connection point 35 which is located between the antenna 1 and the first contact 38 of the second resonance circuit 37'.

A signal received by the second receiving circuit 5 from the antenna 1 via the antenna matching network 36 passes first through the first resonance circuit 33 and thereafter through the third device for filtering 30. The third device for filtering 30 can comprise, for example, a band pass filter. The third device for filtering 30 has a second contact 32 in addition to the first contact 31. The first contact 31 of the third device for filtering 30 has a high reflection coefficient at least for signals being transmitted from the second transmitting circuit 3.

A signal transmitted from the first transmitting circuit 2 via the antenna matching network 36 to the antenna 1 passes first through a first device for switching 6 and finally through the second resonance circuit 37'. The first device for switching 6 has a first contact 7 and a second contact 8 and the second resonance circuit 37' has a second contact 39 in addition to the first contact 38. The first contact 7 of the first device for switching 6 is connected to the first transmitting circuit 2. The second contact 8 of the first device for switching 6 is connected to the second contact 39 of the second resonance circuit 37'. The first contact 38 of the second resonance circuit 37' is connected to the connection point 35 which is located between the antenna 1, the second contact 15 of the first resonance circuit 33 and the first contact 38 of the second resonance circuit 37'. The second resonance circuit 37' consists of a capacitor 38' in parallel with an inductor 38''. According to exemplary embodiments, the second resonance circuit 37' has such a resonance frequency that a signal transmitted from the second transmitting circuit 3 and received by the second receiving circuit 5, respectively, is blocked by the second resonance circuit 37'. The second resonance circuit 37' preferably has a resonance frequency in the mid-range between the frequency band of signals transmitted from the second transmitting circuit 3 and received by the second receiving circuit 5. The first device for switching 6 can comprise, for example, a diode, such as a PIN diode. The first contact 7 of the diode 6 is an anode, while the second contact 8 of the diode 6 is a cathode.

A signal received by the first receiving circuit 4 from the antenna 1 via the antenna matching network 36 passes first through the second resonance circuit 37', and then passes through the first device for impedance transforming 16, and finally passes through a second device for filtering 18. The second device for filtering 18, can comprise, for example, a band pass filter. The first device for impedance transforming 16 has a first contact 19 and a second contact 20, and the second device for filtering 18 has a first contact 23 and a second contact 24. The first contact 19 of the first device for impedance transforming 16 is connected to a connection point 40 which is located between the second contact 8 of the first device for switching 6, the first contact 19 of the first device for impedance transforming 16 and the second contact 39 of the second resonance circuit 37'. The second contact 20 of the first device for impedance transforming 16 is connected to a connection point 27 which is located between the second contact 20 of the first device for impedance transforming 16, the first contact 23 of the second device for filtering 18 and a first contact 26 of the second device for switching 25. The second device for impedance transforming 17 (shown in FIG. 1) is set to zero in FIG. 2 (e.g. is omitted). The first device for impedance transforming 16 is dimensioned to transform a signal transmitted at the first transmitting circuit 2 a quarter of a wavelength in the center of the transmit frequency band.

The second device for switching 25 has, in addition to the first contact 26, also a second contact 28 connected to the signal ground 29. The second device for switching 25 can comprise a diode, such as a PIN diode. The first contact 26 of the diode is an anode and the second contact 28 of the diode is a cathode.

Figure 3:
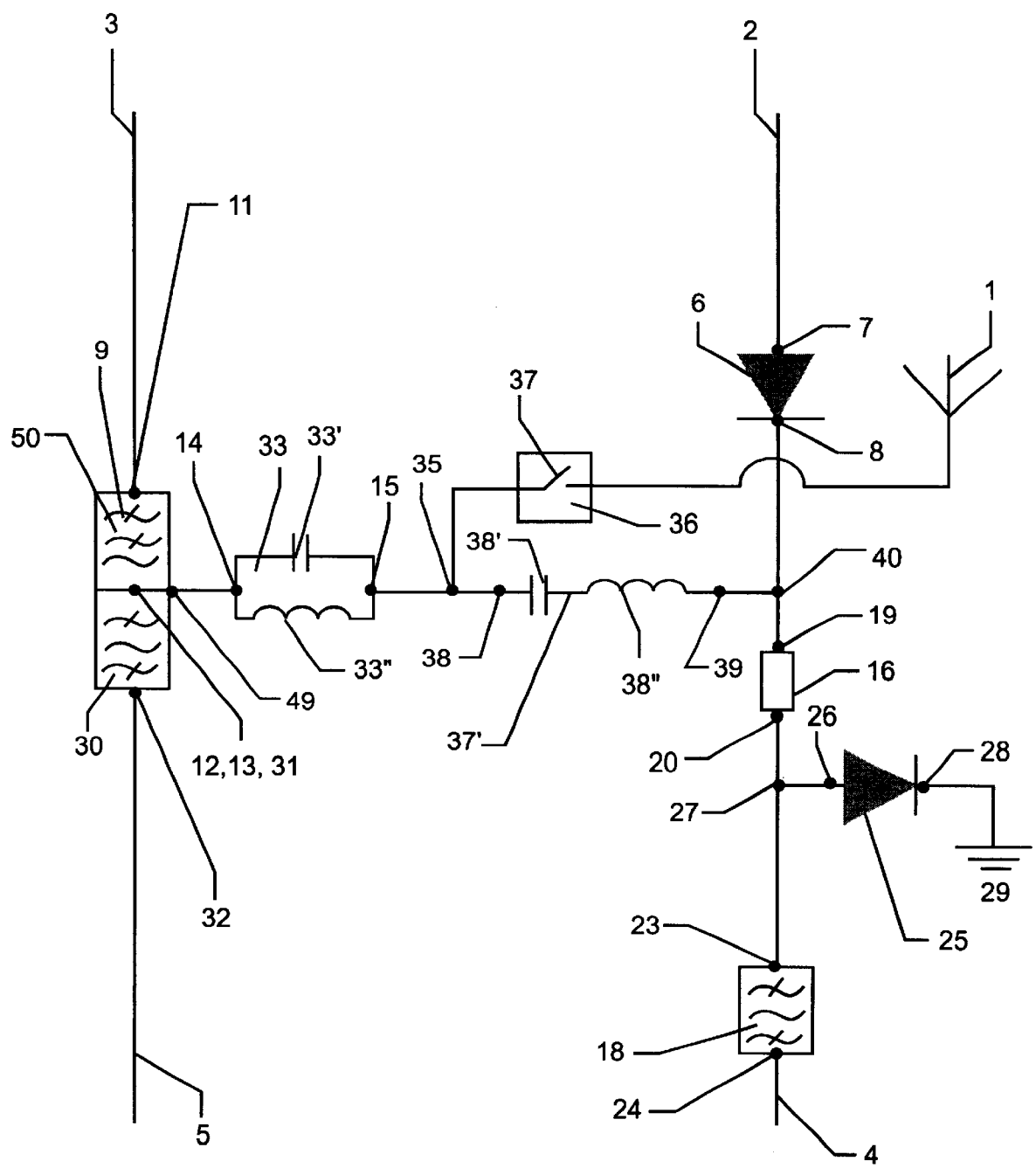
FIGS. 3–8, 9a and 9b are electrical schematic diagrams showing a second to ninth embodiments of signal combining devices for dual band radio communication according to the present invention.
Figure 4:
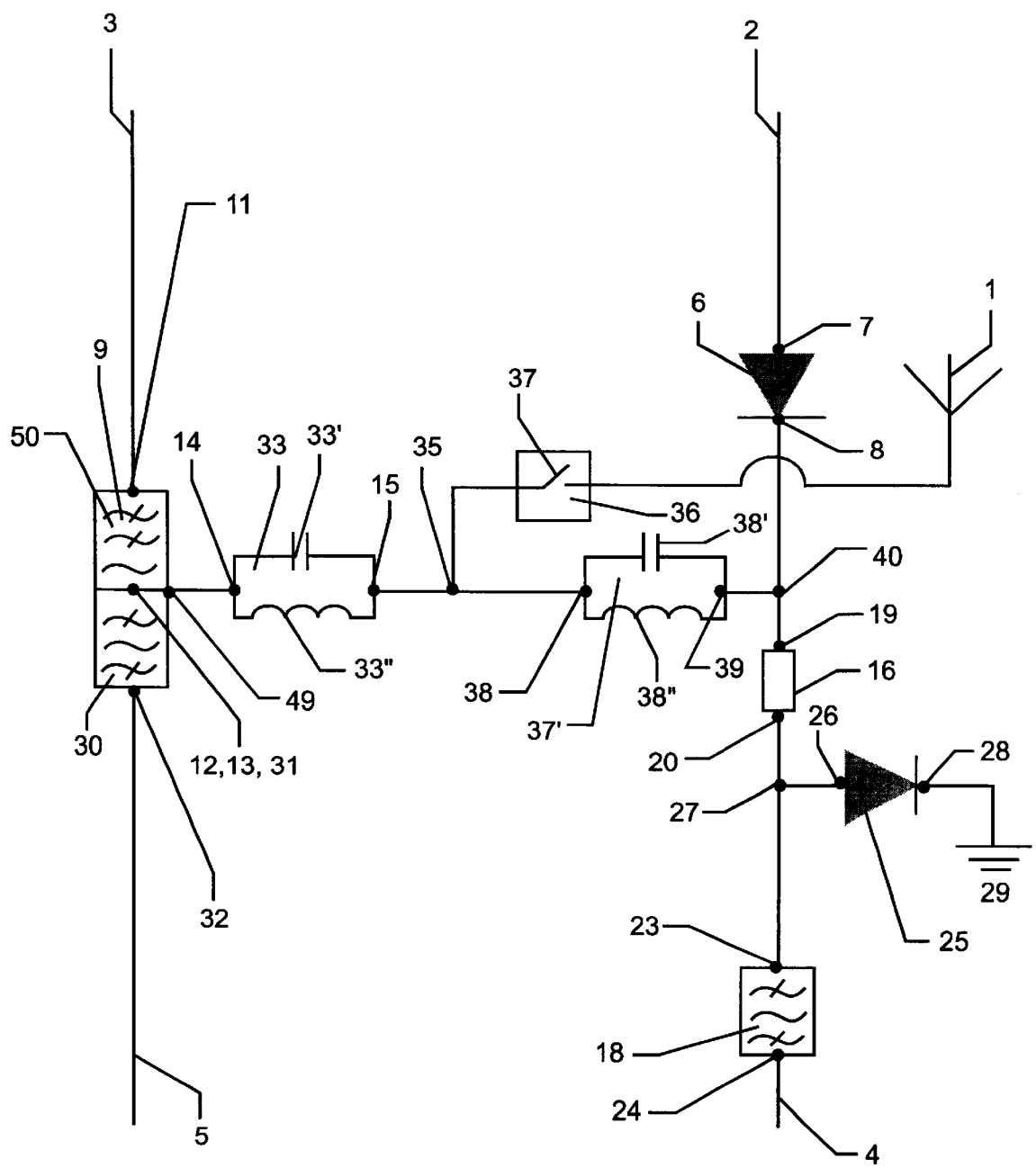
Figure 5:
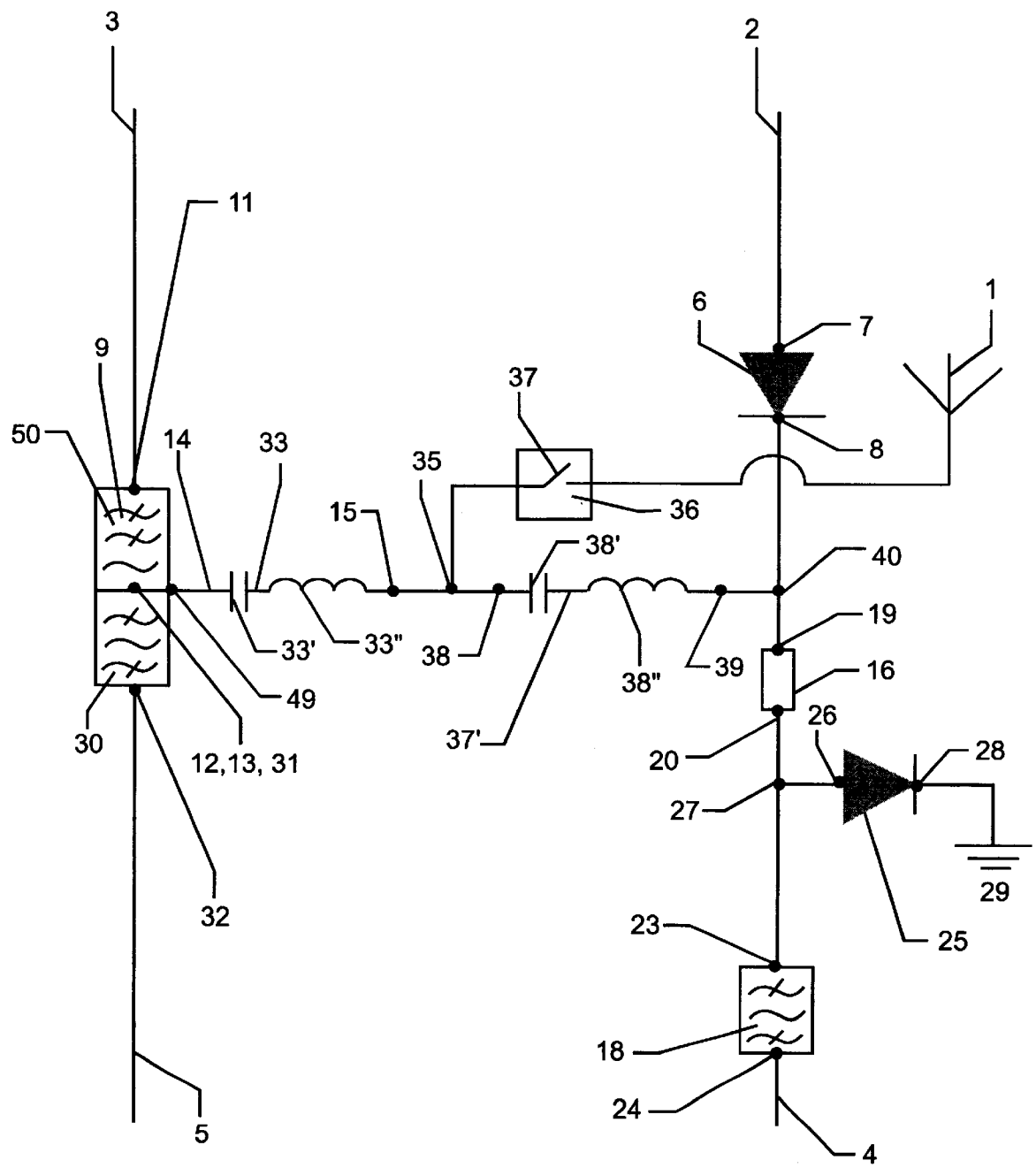

FIGS. 3–5 are electrical schematic diagrams showing a second, third and fourth embodiment, respectively, of a signal combining device for a dual band radio according to the present invention. As before, these circuits find exemplary use for combining signals in a mobile unit having a dual band transmission and reception antenna 1 for operation in a cellular mobile radio communication system including at least one base station and/or for operation in a satellite radio communication system. The electrical schematic diagrams in FIGS. 3–5 are the same as the electrical schematic diagram shown in FIG. 2, except for the constitution of the first resonance circuit 33 and the second resonance circuit 37'.

In FIG. 2, and also in FIG. 5, the first resonance circuit 33 consists of a capacitor 33' in series with an inductor 33'. In both cases, the first resonance circuit 33 has such a resonance frequency that a signal transmitted from the second transmitting circuit 3 and received by the second receiving circuit 5, respectively, readily passes through the first resonance circuit 33. The resonance frequency of the first resonance circuit 33' can, for example, be mid-range between the frequency band of signals transmitted from the second transmitting circuit 3 and the frequency band of signals received by the second receiving circuit 5. In contrast, in FIGS. 3 and 4, the first resonance circuit 33 comprises a capacitor 33' in parallel with an inductor 33". The first resonance circuit 33 in these embodiments has such a resonance frequency that a signal transmitted from the first transmitting circuit 2 and received by the first receiving circuit 4, respectively, is blocked (e.g. stopped) at the first resonance circuit 33. In this embodiment, the first resonance circuit 33 can have, for example, a resonance frequency in the mid-range between the frequency band of signals transmitted from the first transmitting circuit 2 and received by the first receiving circuit 4.

In FIG. 2, and also in FIG. 4, the second resonance circuit 37' comprises a capacitor 38' in parallel with an inductor 38". The second resonance circuit 37' has a resonance frequency within the frequency band of signals transmitted from the second transmitting circuit 3 and received by the second receiving circuit 5. In contrast, in FIGS. 3 and 5, the second resonance circuit 37' comprises a capacitor 38' in series with an inductor 38'. The second resonance circuit 37' in FIGS. 3 and 5 has a resonance frequency within the frequency band of signals transmitted from the first transmitting circuit 2 and received by the first receiving circuit 4, respectively.

Figure 6:
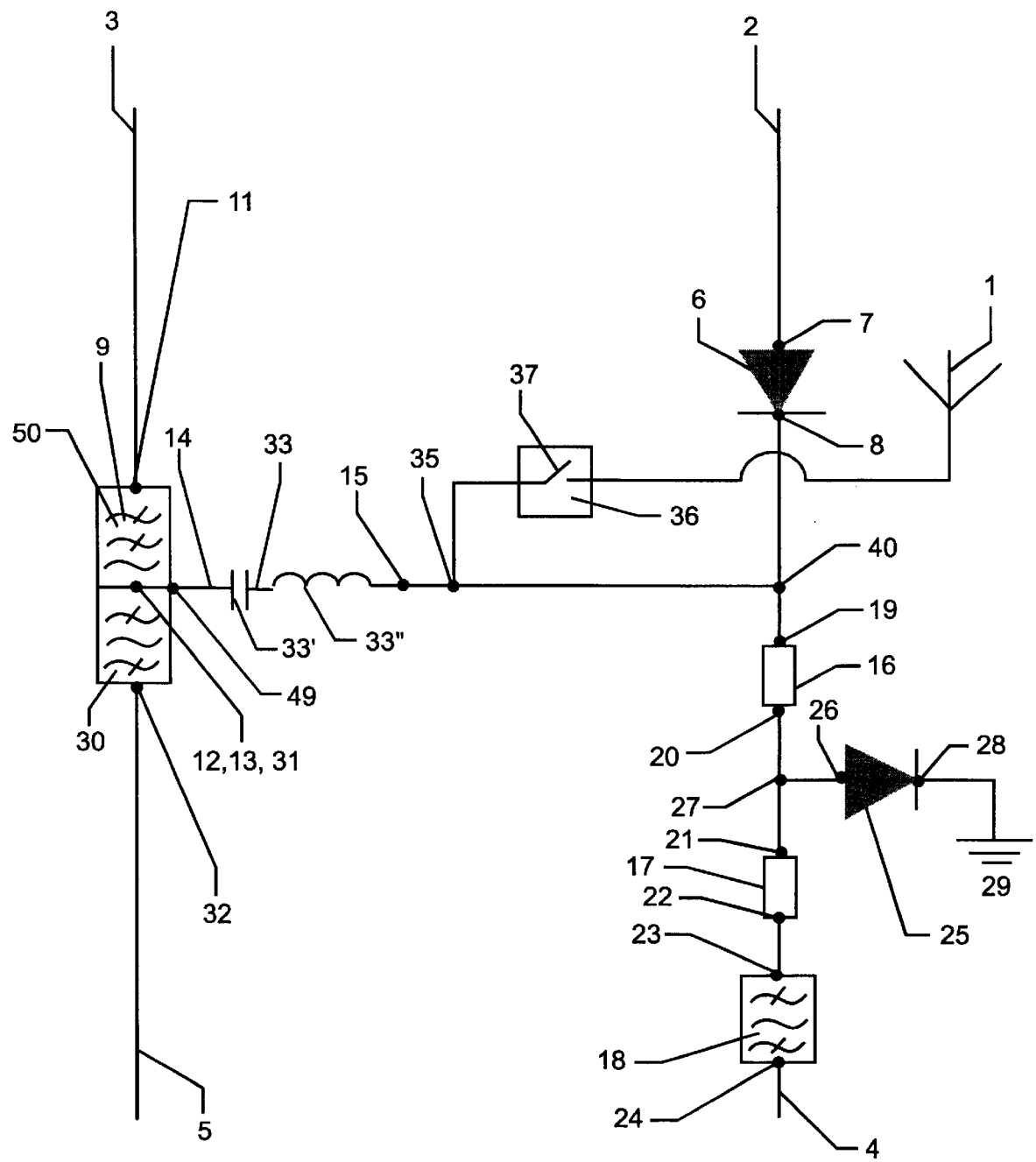
Figure 7:
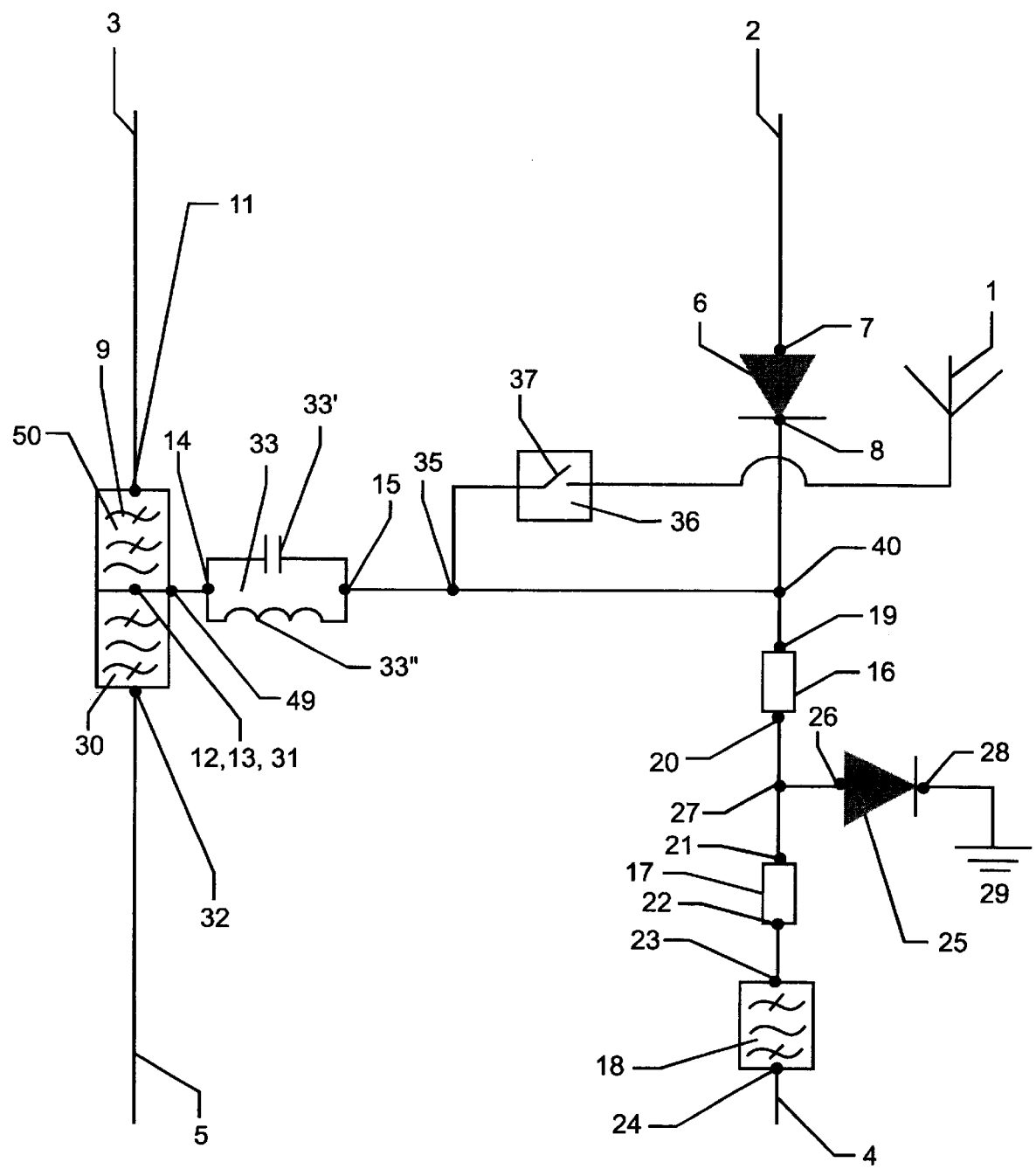

FIGS. 6 and 7 are electrical schematic diagrams showing a fifth and sixth embodiments, respectively, of a signal combining device for a dual band radio according to the present invention. As with the previous embodiments, this configuration finds exemplary use for combining signals in a mobile unit having a dual band transmission and reception antenna 1 for operation in a cellular mobile radio communication system including at least one base station and/or for operation in a satellite radio communication system.

The electrical schematic diagram in FIG. 6 is identical with the electrical schematic diagram in FIG. 2, except that there is no second resonance circuit 37' in FIG. 6 (compared to FIG. 2), and that the second device for impedance transforming 17 is not zero (i.e. is not omitted). The second device for impedance transforming 17 has a first contact 21 and a second contact 22. Hence, in FIG. 6, the connection point 35 which is located between the antenna 1 and the second contact 15 of the first resonance circuit 33 is connected to the connection point 40 which is located between the second contact 8 of the first device for switching 6 and the first contact 19 of the first device for impedance transforming 16. Since the second device for impedance transforming 17 is not zero, the connection point 27 is connected to the second contact 20 of the first device for impedance transforming 16, to the first contact 21 of the second device for impedance transforming 17 and to the first contact 26 of the second device for switching 25. Also, the second contact 22 of the second device for impedance transforming 17 is connected to the first contact 23 of the second device for filtering 18.

The electrical schematic diagram in FIG. 7 is identical with the electrical schematic diagram in FIG. 3, except that there is no second resonance circuit 37' in FIG. 7 (compared to FIG. 3), and that the second device for impedance transforming 17 is not zero (i.e. is not omitted). As in FIG. 6, the second device for impedance transforming 17 has a first contact 21 and a second contact 22. Hence, in FIG. 7, as in FIG. 6, the connection point 35 between the antenna 1 and the second contact 15 of the first resonance circuit 33 is connected to the connection point 40 which is located between the second contact 8 of the first device for switching 6 and the first contact 19 of the first device for impedance transforming 16. Since the second device for impedance transforming 17 is not zero, the connection point 27 (in FIG. 7) is connected to the second contact 20 of the first device for impedance transforming 16, to the first contact 21 of the second device for impedance transforming 17 and to the first contact 26 of the second device for switching 25. Also, the second contact 22 of the second device for impedance transforming 17 is connected to the first contact 23 of the second device for filtering 18.

Consequently, in FIGS. 6 and 7, a signal received by the first receiving circuit 4 also passes through the second device for impedance transforming 17. In both FIGS. 6 and 7, the second device for impedance transforming 17 is so dimensioned that the impedance at the first contact 19 of the first device for impedance transforming 16 is high for signals transmitted at the second transmitting circuit 3 and received by the second receiving circuit 5, respectively.

Figure 8:
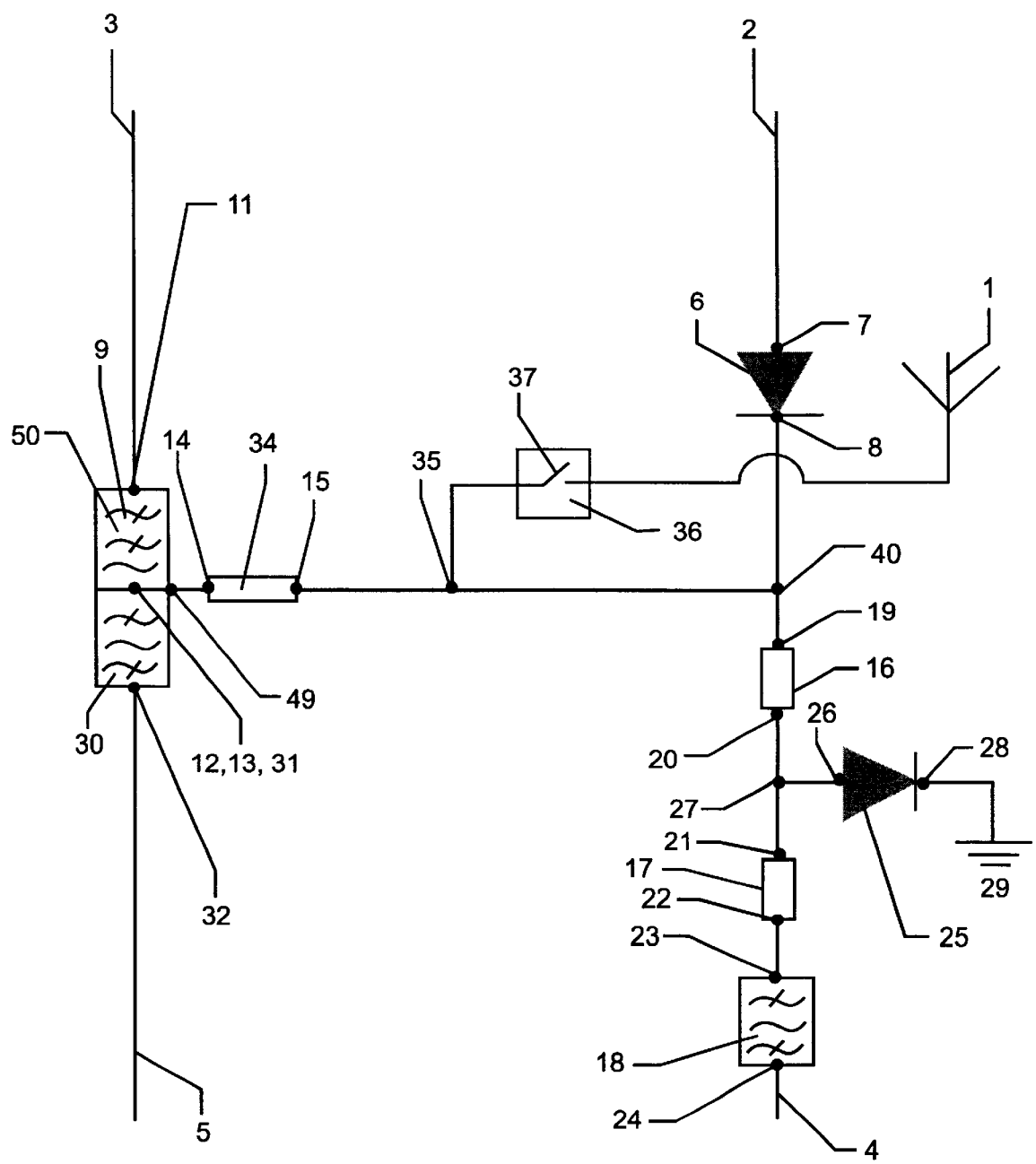

FIG. 8 is an electrical schematic diagram showing a seventh embodiment of a signal combining device for a dual band radio according to the present invention. The electrical schematic diagram in FIG. 8 is identical with the electrical schematic diagram in FIG. 6, except of that there is a third device for impedance transforming 34 in FIG. 8 instead of a first resonance circuit 33 as in FIG. 6. The third device for impedance transforming 34 has a first contact 14 and a second contact 15 just like the first resonance circuit 33. Hence, in FIG. 8 the connection point 35 is connected to the antenna 1, to the second contact 15 of the third device for impedance transforming 34 and to the connection point 40 which is located between the second contact 8 of the first device for switching 6 and the first contact 19 of the first device for impedance transforming 16. Here, the second device for impedance transforming 17 is so dimensioned that the impedance at the first contact 19 of the first device for impedance transforming 16 is high for signals transmitted at the second transmitting circuit 3 and received by the second receiving circuit 5, respectively.

The third device for impedance transforming 34 is so dimensioned that the impedance at the second contact 15 of the third device for impedance transforming 34 is high for signals transmitted from the first transmitting circuit 2 and received by the first receiving circuit 4, respectively. Hence, the impedance at the port corresponding to the contact 49 of the single 3-port duplex filter 50 in FIG. 8 is dimensioned to be transformable to a high impedance at the second contact 15 of the third device for impedance transforming 34 both for signals transmitted from the first transmitting circuit 2 and received by the first receiving circuit 4, respectively. The seventh embodiment in FIG. 8 can be compared with the ninth embodiment in FIG. 9b, at which the impedance at the port corresponding to the contact 49 of the single 3-port duplex filter is dimensioned to be transformable to a high impedance only for signals received by the first receiving circuit 4.

Figure 9A:
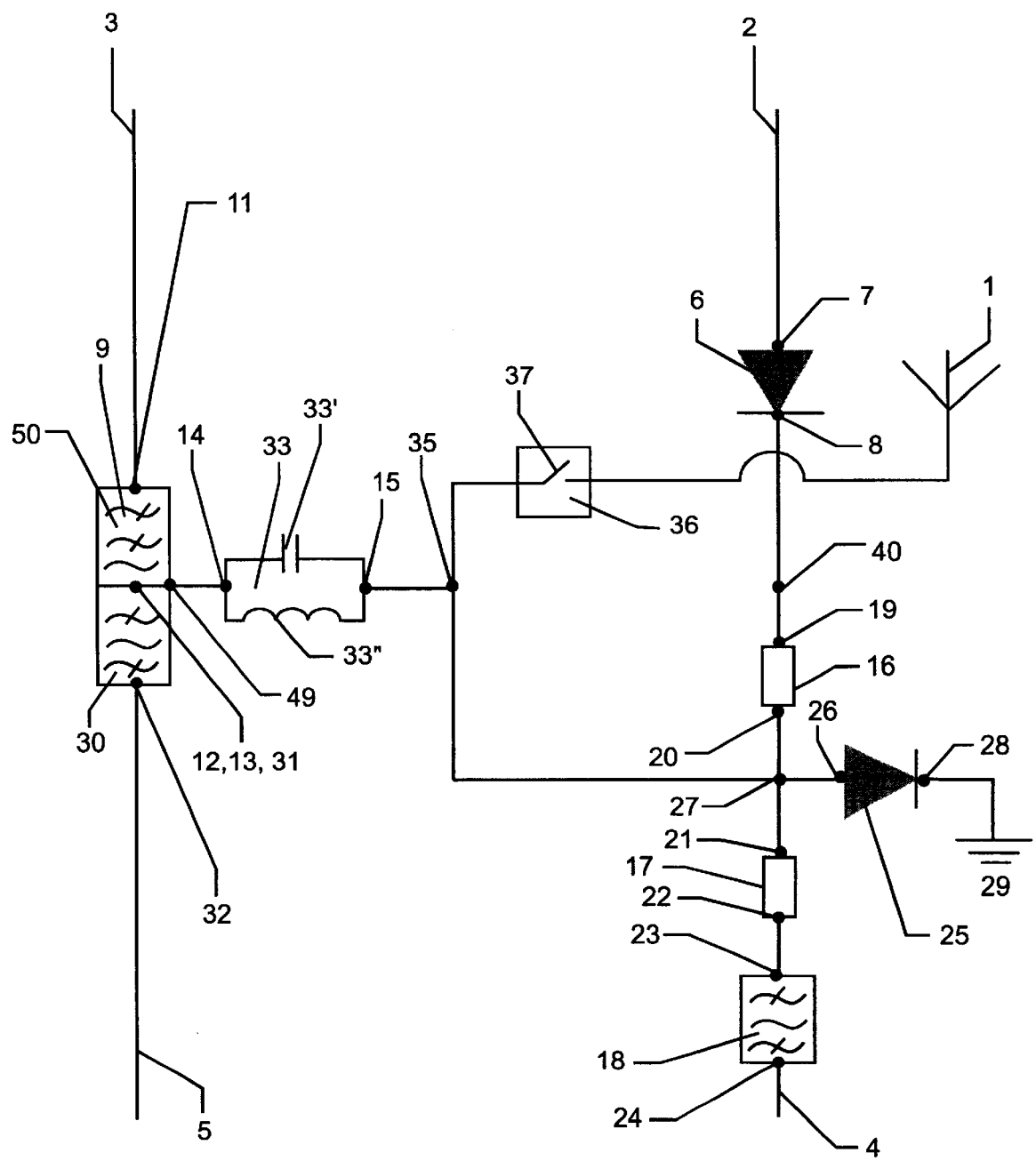
Figure 9B:
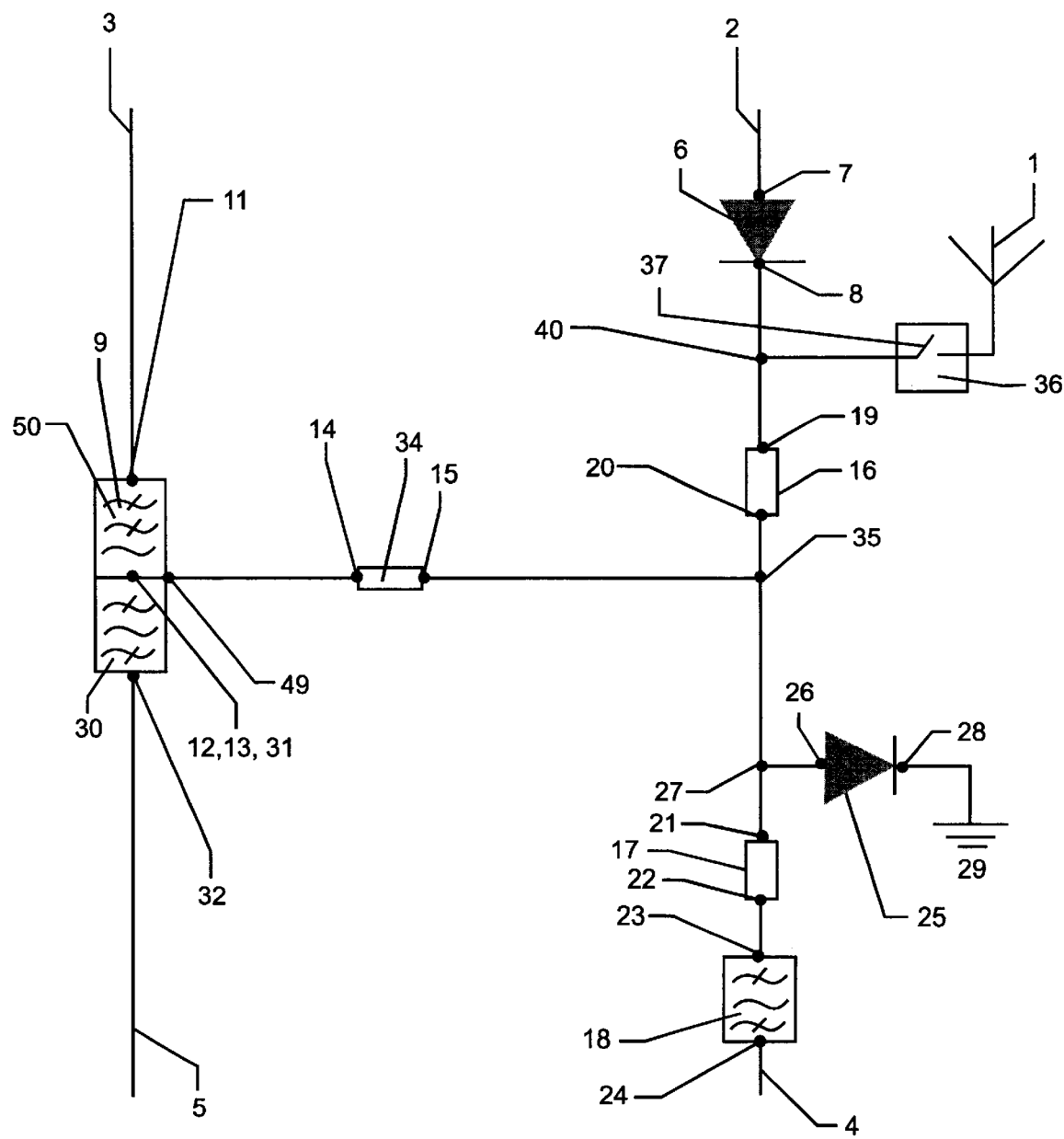

The advantage with this seventh embodiment in FIG. 8, compared with the ninth embodiment in FIG. 9b, is that the total transmission line length to the antenna 1 for signals transmitted from the second transmitting circuit 3 and received by the second receiving circuit 5, respectively, is shorter. Therefore, the signal loss in the FIG. 8 embodiment is lower.

FIG. 9a is an electrical schematic diagram showing an eighth embodiment of a signal combining device for a dual band radio according to the present invention. The electrical schematic diagram in FIG. 9a is identical with the electrical schematic diagram in FIG. 7, except that the connection point 35 between the antenna 1 and the second contact 15 of the first resonance-circuit 33 is connected to the connection point 27 which is located between the second contact 20 of the first device for impedance transforming 16, the first contact 21 of the second device for impedance transforming 17 and the first contact 26 of the second device for switching 25, whereas, in FIG. 7, the connection point 35 is located between the second contact 15 of the first resonance circuit 33 and a connection point 40 which in located between the second contact 8 of the first device for switching 6 and the first contact 19 of the first device for impedance transforming 19. Consequently, a signal transmitted from the first transmitting circuit 2 via the antenna matching network 36 to the antenna 1 passes first the first device for switching 6 and then through the second device for impedance transforming 16. A signal received by the first receiving circuit 4 from the antenna 1 via the antenna matching network 36 passes first the second device for impedance transforming 17 and then through the second device for filtering 18.

FIG. 9b is an electrical schematic diagram showing a ninth embodiment of a signal combining device for a dual band radio according to the present invention. The electrical schematic diagram in FIG. 9b is identical with the electrical schematic diagram in FIG. 8, except that the connection point 35 is connected to the second contact 20 of the first device for impedance transforming 16, to the second contact 15 of the third device for impedance transforming 34 and to the connection point 27 which is located between the second contact 20 of the first device for impedance transforming 16, the first contact 21 of the second device for impedance transforming 17 and the first contact 26 of the second device for switching 25, whereas, in FIG. 8, the connection point 35 is located between the second contact 15 of the third device for impedance transforming 34 and the connection point 40, which in turn is located between the second contact 8 of the first device for switching 6 and to the first contact 19 of the first device for impedance transforming 16.

Hence, in FIG. 9b, the connection point 40 between the second contact 8 of the first device for switching 6 and the first contact 19 of the first device for impedance transforming 16 is directly connected to the antenna 1. Consequently, in FIG. 9b, a signal transmitted from the first transmitting circuit 2 via the antenna matching network 36 to the antenna 1 passes only through the first device for switching 6. A signal received by the first receiving circuit 4 from the antenna 1 via the antenna matching network 36 passes first, as in FIG. 8, through the first device for impedance transforming 16, then through the second device for impedance transforming 17 and finally through the second device for filtering 18. A signal transmitted from the second transmitting circuit 3 to the antenna 1 via the antenna matching network 36 passes first through the first device for filtering 9, then through the third device for impedance transforming 34 and finally through the first device for impedance transforming 16. A signal received by the second receiving circuit 5 from the antenna 1 via the antenna matching network 36 passes first through the first device for impedance transforming 16, then through the third device for impedance transforming 34 and finally through third device for filtering 30.

The third device for impedance transforming 34 is so dimensioned that the impedance at the second contact 15 of the third device for impedance transforming 34 is high for signals received at the first receiving circuit 4. The first device for impedance transforming 16 is so dimensioned that the impedance at the first contact 19 of the first device for impedance transforming 16 is high for signals transmitted from the first transmitting circuit 2 when a DC-controlled switch according to FIG. 10 is activated.

As mentioned above in the description of FIG. 8, the seventh embodiment shown in FIG. 8 can be compared with the ninth embodiment shown in FIG. 9b. Specifically, in FIG. 9b, the impedance at the port corresponding to the contact 49 of the single 3-port duplex filter 50 is dimensioned to be transformable to a high impedance at the second contact 15 of the third device for impedance transforming 34 at least for signals received by the first receiving circuit 4.

Figure 10:
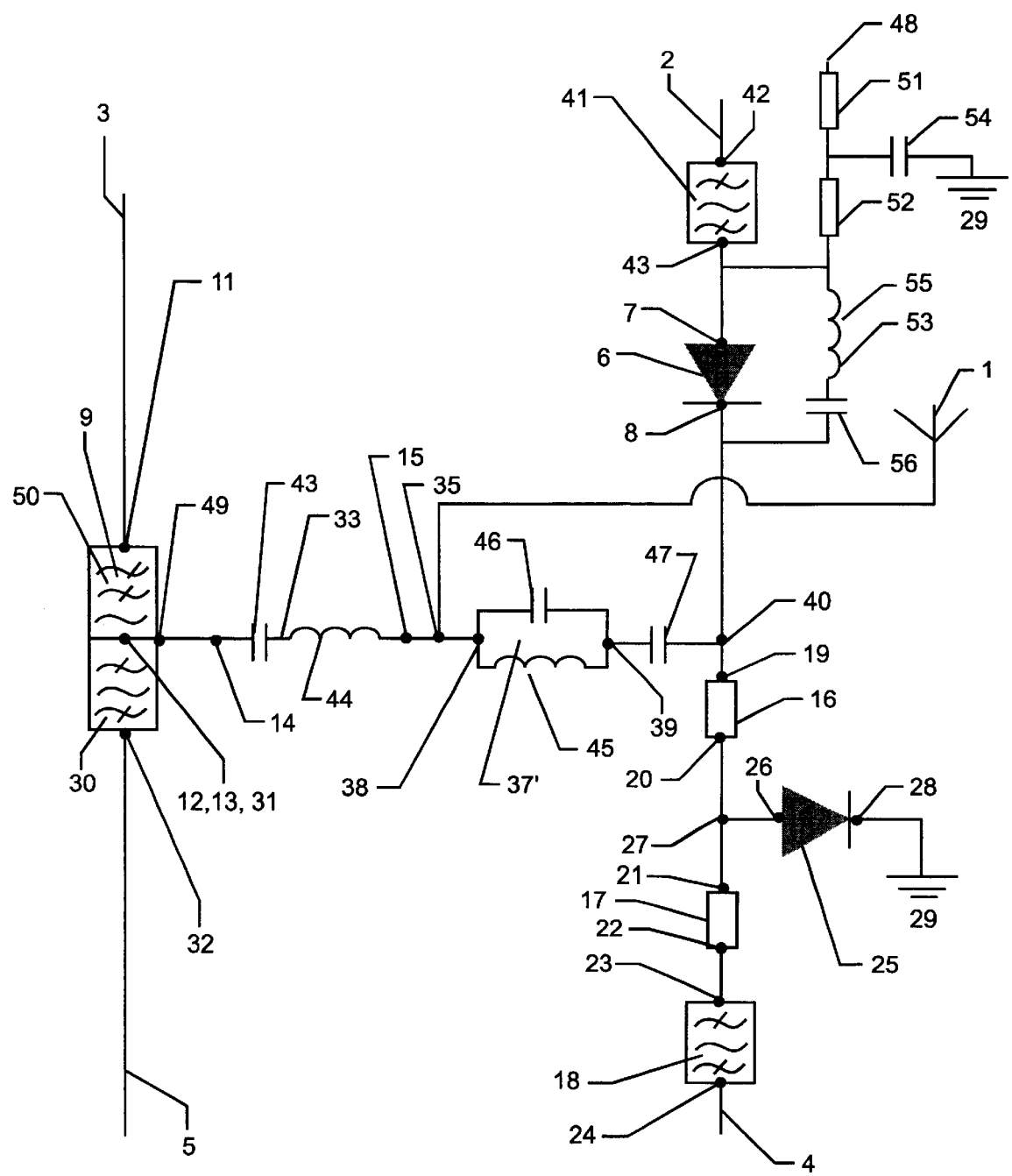
FIG. 10 is an electrical schematic diagram showing yet another embodiment of a signal combining device for dual band radio communication according to the present invention.

FIG. 10 is an electrical schematic diagram showing yet another embodiment of a signal combining device for a dual band radio according to the present invention. FIG. 10 is identical to FIG. 2, except that: (1) the second device for impedance transforming 17 is not zero, i.e. not omitted; (2) there is a band pass filter 41; (3) there is no antenna matching network 36 and no device for switching the antenna matching network 37; and (4) a DC-controlled switch 47–48, 51–56 is added. The second device for impedance transforming 17 has a first contact 21 and a second contact 22. The band pass filter 41 has a first contact 42 and a second contact 43. Consequently, the connection point 27 is connected to the second contact 20 of the first device for impedance transforming 16, to the first contact 21 of the second device for impedance transforming 17 and to the first contact 26 of the second device for switching 25. The second contact 22 of the second device for impedance transforming 17 is connected to the first contact 23 of the second device for filtering 18. The first contact 42 of the band pass filter 41 is connected to the first transmitting circuit 2. The second contact 43 of the band pass filter 41 is connected to the first contact 7 of the first device for switching 6. Consequently, a signal received by the first receiving circuit 4 also passes through the second device for impedance transforming 17, and a signal transmitted form the first transmitting circuit 2 also passes through the band pass filter 41. The band pass filter 41 attenuates frequencies above and under the frequency band of a signal transmitted from the first transmitting circuit 2. The band pass filter 41 can, in another embodiment of the invention, be implemented using a low pass filter which attenuates frequencies above the frequency band of a signal transmitted from the transmitting circuit 2.

The DC-controlled switch consists of a circuit 48, a resistor 51, a fourth device for impedance transforming 52, a capacitor 54 and an inductor 55 in series with a capacitor 56. The capacitor 54 is connected to signal ground 29.

A capacitor 47 is inserted between the second contact 39 of the second resonance circuit 37' and the connection point 40 which is located between the second contact 8 of the first device for switching 6 and the first contact 19 of the first device for impedance transforming 16 in order to block the DC-current applied from the circuit 48. However, other embodiments of the circuit do not use the capacitor 47; the DC-controlled switch can function without the capacitor 47.

The antenna 1 is a dual band transmission and reception antenna having an impedance matching the impedance at the connection point 35 between the antenna 1, the second contact 15 of the first resonance circuit 33 and the first contact 38 of the second resonance circuit 37'.

In FIG. 10, the first device for filtering 9 and the third device for filtering 30 are connected to each other into a single 3-port duplex filter 50, as was the case in FIG. 2. The duplex filter 50 has a reflection coefficient approximately

|Γ|>0.7 at the contact 49 of the duplex filter 50, and the phase shift α of the duplex filter varies approximately ±10° at 1850–1990 MHz. The filter 18 has a reflection coefficient approximately |Γ|>0.9 at the second contact 23 of the filter 18 and the phase shift β of the filter 18 varies approximately ±20° at 824–869 MHz at the second contact 23 of the filter 18. However, as will be apparent to those skilled in the art, these are exemplary values. The values of the reflection coefficients and the phase shifts will vary depending on which components are used in the signal combining device for the dual band radio. The first device for switching 6 and the second device for switching 25 can comprise PIN-diodes.

In all of the embodiments, the values used for the various capacitors and inductors should be chosen to provide the desired resonance frequency, as will be apparent to those skilled in the art. In the embodiment of FIG. 10, for instance, the first resonance circuit 33 consists of a capacitor 43 in series with an inductor 44, and the capacitance of the capacitor 43 is approximately 3.9 pF and the inductance of the inductor 44 is approximately 10 nH. In the second resonance circuit 37', which consists of a capacitor 46 in parallel with an inductor 45, the capacitance of the capacitor 46 is approximately 3.9 pF, and the inductance of the inductor 46 is approximately 10 nH. The same or similar component values can be used in other embodiments.

Referring to all the FIGS. 2–10, the first device for impedance transforming 16, the second device for impedance transforming 17, the third device for impedance transforming 34 and the fourth device for impedance transforming 52 can comprise, for example, transmission lines having appropriate impedances. For example, striplines of appropriate lengths can be used to achieve the functions attributed to the impedance transforming devices 16, 17, 34, and 52, as will be understood by those skilled in the art. For instance, the transforming device 16 in FIG. 9b can comprise a quarter wave length strip (at 1880 MHz).

Having now set forth the exemplary connection between components used in FIGS. 1–8, 9a, 9b, and 10, the mode of operation of these circuits will be discussed in more detail with reference to FIG. 9b.

In FIG. 9b, when a digital signal, for instance within the PCS-frequency band of 1850–1990 MHz, is transmitted from the first transmitting circuit 2, the first device for switching 6 and the second device for switching 25 become conductive for signals of the frequency band that are transmitted from the first transmitting circuit 2. This can be implemented, for instance, using a DC-controlled switch, as shown in FIG. 10. The second device for switching 25, which is a diode, such as a PIN-diode, shorts the connection point 27 which is located between the second contact 20 of the first device for impedance transforming 16, the first contact 21 of the second device for impedance transforming 17 and the first contact 26 of the second device for impedance transforming 25 to ground. This short is transformed to an open circuit by means of the first device for impedance transforming 16, since the first device for impedance transforming 16 is transforming a signal transmitted at the first transmitting circuit 2 nearly a quarter of a wavelength. Hence, the signal transmitted from the first transmitting circuit 2 will be transmitted through the first device for switching 6 to the antenna 1 via the antenna matching network 36. When a signal is not transmitted from the first transmitting circuit 2, the first device for switching 6 and the second device for switching 25 are switched off, such that no DC-current is applied from a DC-source if a DC-controlled switch as described in FIG. 10 is used.

Also in FIG. 9b, when an analogue signal, for instance within the AMPS-frequency band of 824–894 MHz, is transmitted from the second transmitting circuit 3, the signal passes first through the 3-port duplex filter 50, and then through the third device for impedance transforming 34 to the connection point 35 which is connected to the second contact 20 of the first device for impedance transforming 16, to the second contact 15 of the third device for impedance transforming 34 and to the connection point 27 which is located between the second contact 20 of the first device for impedance transforming 16, the first contact 21 of the second device for impedance transforming 17 and the first contact 26 of the second device for switching 25. Here, the second device for impedance transforming 17 is so dimensioned that the impedance at the first contact 21 of the second device for impedance transforming 17 is high for signals transmitted at the second transmitting circuit 3 and received by the second receiving circuit 5, respectively. The second device for impedance transforming 17 shown in FIG. 9a operates in the same manner. Since no signal is transmitted from the first transmitting circuit 2, the first device for switching 6 and the second device for switching 26 will be switched off, and the signal will pass through the first device for impedance transforming 16 to the antenna 1 via the antenna matching network 36.

Also in FIG. 9b, when a digital signal, for instance within the PCS-frequency band of 1850–1990 MHz, is received by the first receiving circuit 4 from the antenna 1 via the antenna matching network 36, the signal passes through the first device for impedance transforming 16 to the connection point 35 which is connected to the second contact 20 of the first device for impedance transforming 16, to the second contact 15 of the third device for impedance transforming 34 and to the connection point 27 which is located between the second contact 20 of the first device for impedance transforming 16, the first contact 21 of the second device for impedance transforming 17 and the first contact 26 of the second device for switching 25. Since no signal is transmitted from the first transmitting circuit 2, both the first device for switching 6 and the second device for switching 26 will be switched off. Since the third device for impedance transforming 34 is so dimensioned that the impedance at the second contact 15 of the third device for impedance transforming 34 is high at least for signals received by the first receiving circuit 4, the signal will pass through the second device for impedance transforming 17 and finally pass through the second device for filtering 18 to the first receiving circuit 4.

Also in FIG. 9b, when an analogue signal, for instance within the AMPS-frequency band of 824–894 MHz, is received by the second receiving circuit 5 from the antenna 1 via the antenna matching network 36, the signal passes through the first device for impedance transforming 16 to the connection point 35 which is connected to the second contact 20 of the first device for impedance transforming 16, to the second contact 15 of the third device for impedance transforming 34 and to the connection point 27 which is located between the second contact 20 of the first device for impedance transforming 16, the first contact 21 of the second device for impedance transforming 17 and the first contact 26 of the second device for switching 25. Since no signal is transmitted from the first transmitting circuit 2, both the first device for switching 6 and the second device for switching 26 will be switched off. Here, the second device for impedance transforming 17 is so dimensioned that the impedance at the first contact 21 of the second device for impedance transforming 17 is high for signals transmitted at the second transmitting circuit 3 and received by the second receiving circuit 5, respectively. Consequently, the signal will pass through the third device for impedance transforming 34 and finally pass through the duplex filter 50 to the second receiving circuit 5.

FIGS. 1–9a and FIG. 10 employ the same basic theory of operation described above with respect to FIG. 9b. Namely, in all of the embodiments, all signals received by the receiving circuits 4, 5 from the antenna 1 and all signals transmitted from the transmitting circuits 2, 3 to the antenna 1 are fed to the desired circuit or to the antenna 1 via connection points 13, 27, 35, 40. The device for impedance transforming 16, 17, 34, the device for matching 10, and the resonance frequencies of the resonance circuits 33, 37' are dimensioned accordingly in each embodiment to ensure that the signals are channeled to their proper respective destinations, as will be apparent to those skilled in the art.

In one exemplary embodiment of the invention, a time-multiplex-access technique (such as Time Division Multiple Access (TDMA)) is used to transmit and receive, respectively, a digital signal, and the digital signal is transmitted and received during respective time-slots. For instance, the duration of these time-slots in the GSM system is approximately 0.577 ms and in the D-AMPS system, approximately 6–7 ms. Thus, the duration of the time-slot varies according to which communication system the present invention is used in.

A frequency multiplex access technique (such as Frequency Division Multiple Access (FDMA)) can also be used to transmit and receive, respectively, a digital signal, as long as there is sufficient band separation between the frequencies of the signal that the first transmitting circuit 2 is designed to transmit and the analogue signal that the second transmitting circuit 3 is designed to transmit. A frequency multiplex access technique (such as Frequency Division Multiple Access (FDMA)) can also be used to transmit and receive, respectively, analogue signals in another embodiment of the present invention.

When the second resonance circuit 37' is used, the Code Division Multiple Access (CDMA) technique can also be used to transmit and receive, respectively, a digital signal. When this mode is used, however, the first device for switching 6 and the second device for switching 25 are not used, according to exemplary embodiments.

To further supplement the reader's understanding of the present invention, two examples are presented below which describe the exemplary operating characteristics of the device shown in FIG. 10.

EXAMPLE 1

In a signal combining device for a dual band radio according to FIG. 10, analogue signals within the AMPS-frequency band of 824–894 MHz were transmitted from the second transmitting circuit 3 to the antenna 1, and alternately received by the second receiving circuit 5 from the antenna 1. The loss of the analogue signals within the AMPS-frequency band of 824–894 MHz transmitted from the second transmitting circuit 3 to the antenna 1, and received by the second receiving circuit 5 from the antenna 1, were 0.3 dB between the antenna 1 and the first contact 14 of the first resonance circuit 33.

EXAMPLE 2

In the signal combining device for a dual band radio described in example 1, digital signals within the PCS-frequency band of 1850–1990 MHz were transmitted from the first transmitting circuit 2 to the antenna 1 alternately received by the first receiving circuit 4 from the antenna 1. Every time a signal was transmitted from the first transmitting circuit 2, a DC-current was applied from the circuit 48 100 μs before the signal was transmitted from the first transmitting circuit 2. Consequently, the DC-signal applied from the circuit 48 controlled the DC-controlled switch in FIG. 10. A DC-current applied from the circuit 48 can be controlled by a microprocessor. The DC-current applied from the circuit 48 was hence fed through the PIN-diodes 6 and 25, respectively. The PIN-diodes become conductive for the frequency 1850–1990 when a DC-current is fed through them.

The loss of the digital signals within the PCS-frequency band of 1850–1990 MHz transmitted from the first transmitting circuit 2 to the antenna 1, and received by the first receiving circuit 4 from the antenna 1, was 0.1 dB between the antenna 1 and the second contact 39 of the second resonance circuit 37'.

Those skilled in the art will realize that various changes can be introduced into the structure and mode of operation of the devices shown in FIGS. 1–10. For instance, the invention has been described in the context of a dual band radio. Another exemplary embodiment of the present invention provides a signal combining device for a multi-band (e.g. more than two bands) radio communication system using a single antenna. This embodiment employs more than two transmitting and receiving circuits (not shown), respectively, which are connected to a device for matching, which, in turn, is connected to the antenna.

The invention has been described in terms of a dual mode antenna, in which the mobile radio can receive both analogue and digital signals. However, the same principles discussed above can be used for a mobile radio which receives two different bands of analogue signals, or two different bands of digital signals.

More specifically, the present invention can be used in many types of communication systems (other than the above-mentioned cellular and satellite systems). An example of such a radio communication system is the DECT system (Digital European Cordless Telephone). Examples of digital radio communication systems in which the signal combining device according to the present invention can be used are D-AMPS 800, D-AMPS 1900, DCS 1800, PCS 1900, GSM 900, GSM 1800, PDC 800 and PDC 1500. Examples of analogue radio communication systems in which the signal combining device according to the present invention can be used are NMT 450, AMPS 800, NMT 900 and TACS. By means of the present invention, it is possible to combine analogue signals of any of the aforementioned analogue radio communication systems and digital signals of any of the aforementioned digital radio communication systems, so long as the analogue and digital signals have sufficiently different frequency bands. It is also possible by means of the present invention to combine different analogue signals of any of the aforementioned analogue radio communication systems, if the analogue signals are of different frequency bands. The same applies to the digital signals used in the aforementioned digital radio communication systems.

Furthermore, referring to all of the FIGS. 1–9b, in one embodiment, the antenna matching network 36 and the device for switching the antenna matching network 37 are not a part of the invention since the antenna 1 can comprise a dual band transmission and reception antenna having an impedance matching the impedance at the connection point 35 between the antenna 1 and the second contact 15 of the device for matching 10 for both bands. In this embodiment of the invention, the dual band transmission and reception antenna is preferably around 50 ohms for both bands. However, if the antenna matching network 36 is included in the invention in all of the FIGS. 1–9b, the antenna matching network 36 will transform the antenna impedance to an impedance suitable for both bands at the connecting point 35, where the connection point 35 is here defined in accordance with the definition of the connection point 35 in each of FIGS. 1–9b above. If the antenna matching network 36 is a part of the invention, the antenna matching network 36 can either be a purely passive device or, if necessary, the matching network 36 can be switched by the device for switching the antenna matching network 37 depending on what band the antenna 1 is being used at.

Referring to all of the FIGS. 1–5 and 10, the second device for filtering 18 can be omitted.

Thus, in conclusion, the above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A signal combining device for a multi-band radio, the multi-band radio comprising a common antenna, and at least a first transmitting circuit, a first receiving circuit, a second transmitting circuit, and a second receiving circuit, the signal combining device comprising:

a first resonance circuit connected to the antenna, for selectively passing signals transmitting and received, respectively, from/by the second transmitting and receiving circuits; and a second resonance circuit connected to the antenna, for selectively passing signals transmitting and received, respectively, from/by the first transmitting and receiving circuits;

wherein the first resonance circuit comprises at least a capacitor and an inductor connected in either series or parallel, and the second resonance circuit comprises at least another capacitor and another inductor connected in either series or parallel;

a first switching device having a first contact connected to the first transmitting circuit and a second contact connected to a second contact of the second resonance circuit;

a first device for impedance transforming having a first contact connected to the second contact of the first switching device, and also having a second contact;

a second switching device having a first contact connected to the second contact of the first device for impedance transforming, and having a second contact connected to ground;

a first filter having a first contact connected to the second transmitting circuit, and having a second contact connected to a first contact of the first resonance circuit; and a second filter having a first contact connected to the second contact of the first device for impedance transforming;

a third filter having a first contact connected to the second contact of the first filter, and having a second contact connected to the second receiving circuit; and an antenna matching circuit having a first contact connected to the antenna and having a second contact connected to a point located between the first resonance circuit and the second resonance circuit.

* * * * *